US012601825B2

(12) United States Patent
Parthasarathy et al.

(10) Patent No.: US 12,601,825 B2
(45) Date of Patent: Apr. 14, 2026

(54) WIRELESSLY IDENTIFYING DEVICE LOCATIONS

(71) Applicant: TEXAS INSTRUMENTS INCORPORATED, Dallas, TX (US)

(72) Inventors: Prasanna Parthasarathy, Frisco, TX (US); Fernando David Lara Alva, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 667 days.

(21) Appl. No.: 17/989,335

(22) Filed: Nov. 17, 2022

(65) Prior Publication Data

US 2024/0168146 A1     May 23, 2024

(51) Int. Cl.
| *G01S 11/06* | (2006.01) |
| *G01S 11/04* | (2006.01) |
| *H04W 4/029* | (2018.01) |

(52) U.S. Cl.
CPC .............. *G01S 11/06* (2013.01); *G01S 11/04* (2013.01); *H04W 4/029* (2018.02)

(58) Field of Classification Search
None
See application file for complete search history.

(56) References Cited

U.S. PATENT DOCUMENTS

| 2005/0190098 A1 * | 9/2005 | Bridgelall ............. G01S 13/878 342/146 |
| 2019/0242949 A1 * | 8/2019 | Lemkin ................. H01M 10/42 |
| 2022/0299337 A1 * | 9/2022 | Joao .................... H02J 7/00032 |

FOREIGN PATENT DOCUMENTS

| EP | 4050696 A1 * | 8/2022 | ......... H01M 10/488 |
| JP | 2001159680 A * | 6/2001 | ............. G01S 13/46 |
| KR | 20210007225 A * | 1/2021 | ............. G01S 11/06 |

* cited by examiner

*Primary Examiner* — Adolf Dsouza
(74) *Attorney, Agent, or Firm* — Carl G. Peterson; Frank D. Cimino

(57)     ABSTRACT

An electronic device comprises a processor and storage coupled to the processor. The storage includes executable code, which, when executed by the processor, causes the processor to: receive a first wireless signal; receive a second wireless signal; determine a first angle of arrival for the first wireless signal and a second angle of arrival for the second wireless signal; determine a first signal strength of the first wireless signal and a second signal strength of the second wireless signal; and based on the first and second angles of arrival and the first and second signal strengths, determine a location within a battery pack of a first battery device of the battery pack relative to a location of a second battery device of the battery pack.

17 Claims, 7 Drawing Sheets

300

302 — ASSIGNING BATTERY DEVICE IDs

304 — RECEIVING A FIRST WIRELESS SIGNAL FROM A FIRST VEHICLE BATTERY DEVICE

306 — RECEIVING A SECOND WIRELESS SIGNAL FROM A SECOND VEHICLE BATTERY DEVICE

308 — DETERMINING ANGLES OF ARRIVAL FOR THE FIRST AND SECOND WIRELESS SIGNALS

310 — DETERMINING SIGNAL STRENGTHS OF THE FIRST AND SECOND WIRELESS SIGNALS

312 — BASED ON THE ANGLES OF ARRIVAL AND SIGNAL STRENGTHS, DETERMINING A LOCATION OF THE FIRST VEHICLE BATTERY DEVICE RELATIVE TO A LOCATION OF THE SECOND VEHICLE BATTERY DEVICE

314 — STORE BATTERY DEVICE IDs AND LOCATIONS IN DATA STRUCTURE

300

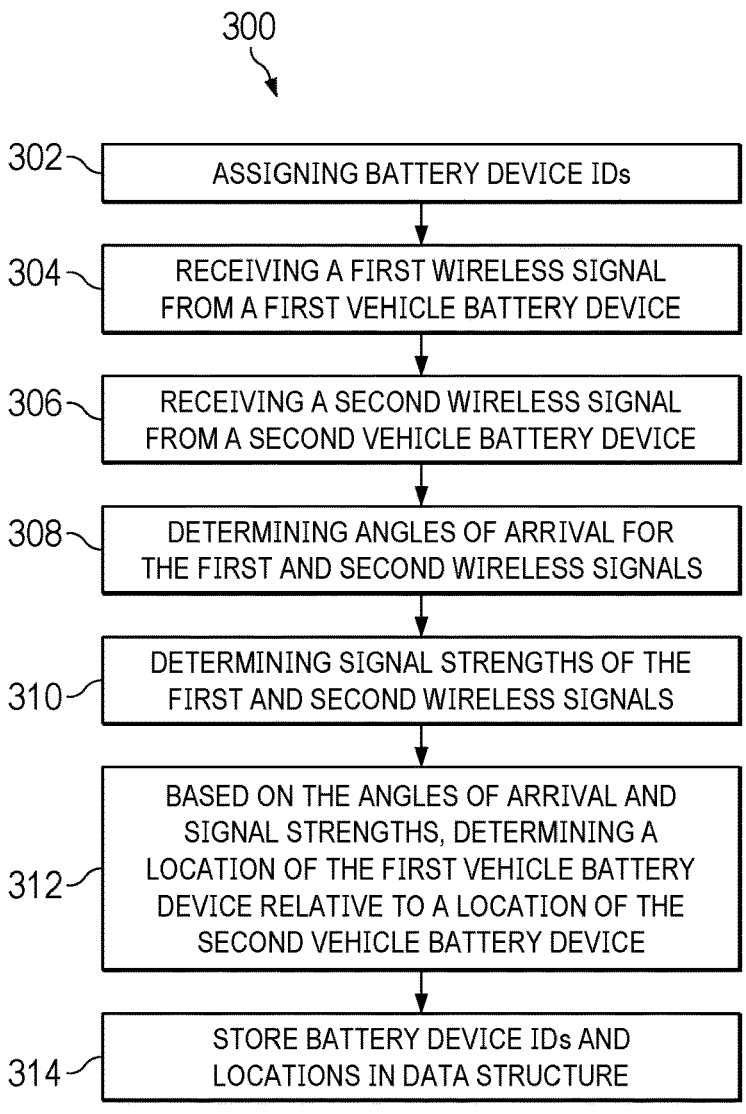

302 — ASSIGNING BATTERY DEVICE IDs

304 — RECEIVING A FIRST WIRELESS SIGNAL FROM A FIRST VEHICLE BATTERY DEVICE

306 — RECEIVING A SECOND WIRELESS SIGNAL FROM A SECOND VEHICLE BATTERY DEVICE

308 — DETERMINING ANGLES OF ARRIVAL FOR THE FIRST AND SECOND WIRELESS SIGNALS

310 — DETERMINING SIGNAL STRENGTHS OF THE FIRST AND SECOND WIRELESS SIGNALS

312 — BASED ON THE ANGLES OF ARRIVAL AND SIGNAL STRENGTHS, DETERMINING A LOCATION OF THE FIRST VEHICLE BATTERY DEVICE RELATIVE TO A LOCATION OF THE SECOND VEHICLE BATTERY DEVICE

314 — STORE BATTERY DEVICE IDs AND LOCATIONS IN DATA STRUCTURE

FIG. 3

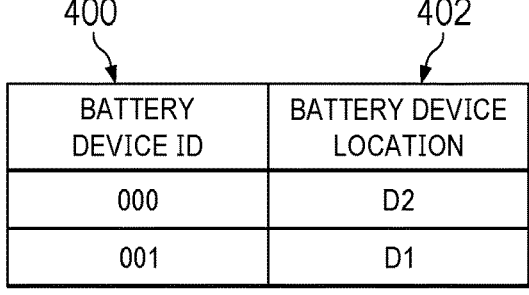

| BATTERY DEVICE ID | BATTERY DEVICE LOCATION |
|---|---|
| 000 | D2 |
| 001 | D1 |

BELOW FOOTWELL

BELOW DRIVER'S SEAT

BELOW

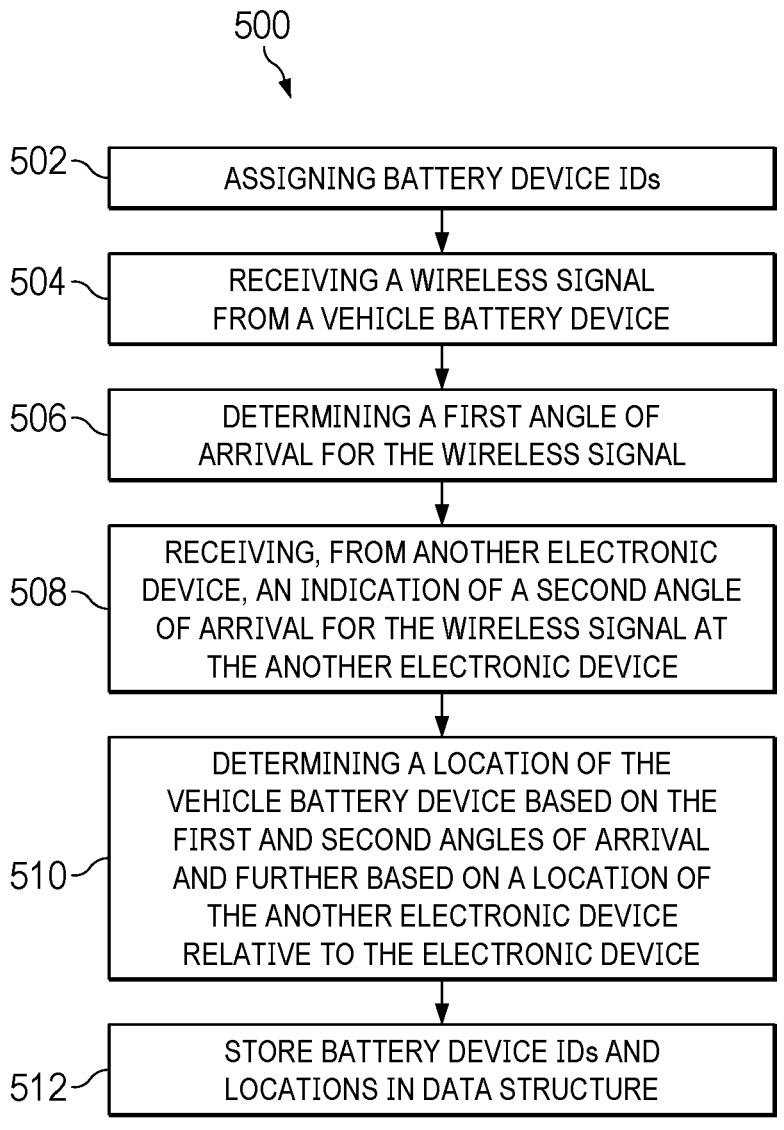

500

502 — ASSIGNING BATTERY DEVICE IDs

504 — RECEIVING A WIRELESS SIGNAL
FROM A VEHICLE BATTERY DEVICE

506 — DETERMINING A FIRST ANGLE OF
ARRIVAL FOR THE WIRELESS SIGNAL

508 — RECEIVING, FROM ANOTHER ELECTRONIC
DEVICE, AN INDICATION OF A SECOND ANGLE
OF ARRIVAL FOR THE WIRELESS SIGNAL AT
THE ANOTHER ELECTRONIC DEVICE

510 — DETERMINING A LOCATION OF THE
VEHICLE BATTERY DEVICE BASED ON THE
FIRST AND SECOND ANGLES OF ARRIVAL
AND FURTHER BASED ON A LOCATION OF
THE ANOTHER ELECTRONIC DEVICE
RELATIVE TO THE ELECTRONIC DEVICE

512 — STORE BATTERY DEVICE IDs AND
LOCATIONS IN DATA STRUCTURE

FIG. 5

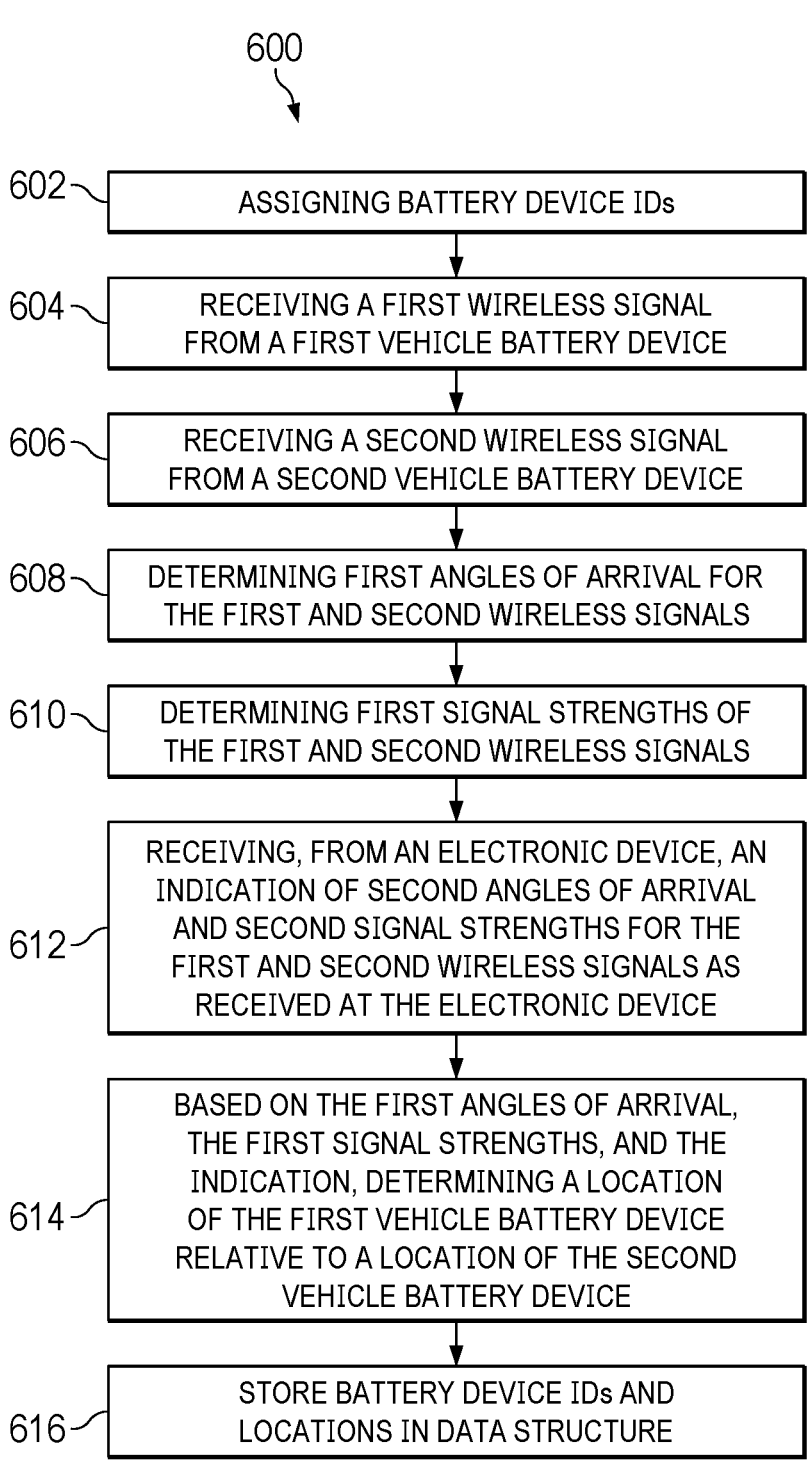

600

602 — ASSIGNING BATTERY DEVICE IDs

604 — RECEIVING A FIRST WIRELESS SIGNAL FROM A FIRST VEHICLE BATTERY DEVICE

606 — RECEIVING A SECOND WIRELESS SIGNAL FROM A SECOND VEHICLE BATTERY DEVICE

608 — DETERMINING FIRST ANGLES OF ARRIVAL FOR THE FIRST AND SECOND WIRELESS SIGNALS

610 — DETERMINING FIRST SIGNAL STRENGTHS OF THE FIRST AND SECOND WIRELESS SIGNALS

612 — RECEIVING, FROM AN ELECTRONIC DEVICE, AN INDICATION OF SECOND ANGLES OF ARRIVAL AND SECOND SIGNAL STRENGTHS FOR THE FIRST AND SECOND WIRELESS SIGNALS AS RECEIVED AT THE ELECTRONIC DEVICE

614 — BASED ON THE FIRST ANGLES OF ARRIVAL, THE FIRST SIGNAL STRENGTHS, AND THE INDICATION, DETERMINING A LOCATION OF THE FIRST VEHICLE BATTERY DEVICE RELATIVE TO A LOCATION OF THE SECOND VEHICLE BATTERY DEVICE

616 — STORE BATTERY DEVICE IDs AND LOCATIONS IN DATA STRUCTURE

FIG. 6

WIRELESSLY IDENTIFYING DEVICE LOCATIONS

BACKGROUND

Some electronic devices, such as electric vehicles (EVs), are battery-powered. An EV may include a battery pack. The battery pack may include multiple battery devices. Each battery device, in turn, may include multiple battery cells and a processor to monitor the activity and status of the battery cells.

SUMMARY

In examples, an electronic device comprises a processor and storage coupled to the processor. The storage includes executable code, which, when executed by the processor, causes the processor to: receive a first wireless signal; receive a second wireless signal; determine a first angle of arrival for the first wireless signal and a second angle of arrival for the second wireless signal; determine a first signal strength of the first wireless signal and a second signal strength of the second wireless signal; and based on the first and second angles of arrival and the first and second signal strengths, determine a location within a battery pack of a first battery device of the battery pack relative to a location of a second battery device of the battery pack.

In examples, a method comprises receiving a first wireless signal, receiving a second wireless signal, and determining first angles of arrival for the first and second wireless signals. The method also comprises determining first signal strengths of the first and second wireless signals, receiving an indication of second angles of arrival and second signal strengths for the first and second wireless signals relative to an electronic device, and based on the first angles of arrival, the first signal strengths, and the indication, determining a location of a first battery device within a battery pack relative to a location of a second battery device within the battery pack.

BRIEF DESCRIPTION OF THE DRAWINGS

FIG. 3 is an example flow diagram of a method for determining battery device locations using wireless signals.

FIG. 4A is an example data structure cross-referencing battery device identifiers (IDs) with battery device locations.

FIGS. 4B and 4C show example location maps indicating battery device locations relative to an EV.

FIGS. 5 and 6 are example flow diagrams of methods for determining battery device locations using wireless signals.

DETAILED DESCRIPTION

Figure 1:
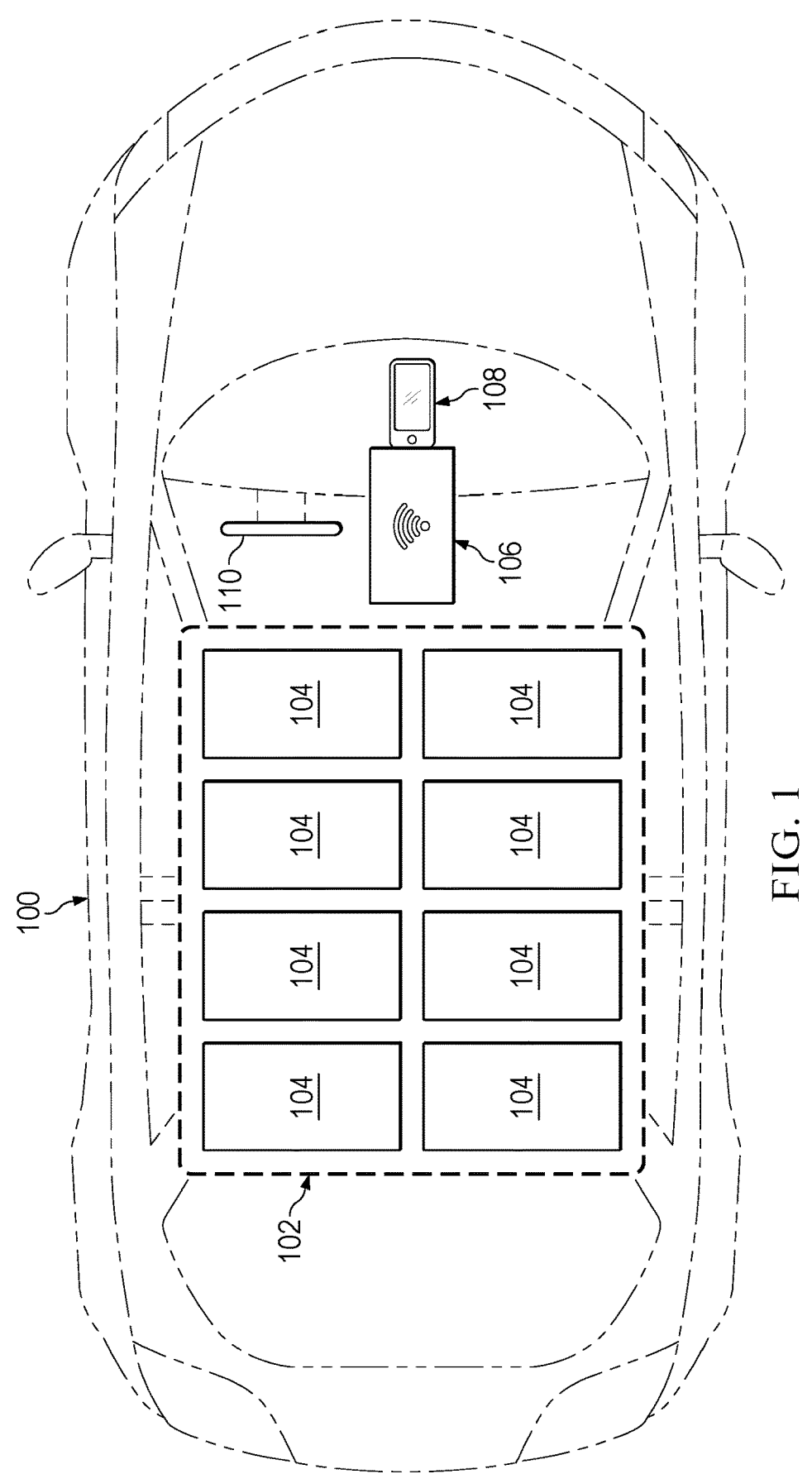
FIG. 1 is a top view of an example EV including a battery pack controller and a battery pack having multiple battery devices.

Some battery-operated electronic devices have complex battery structures. For example, as explained above, an EV may include a battery pack. The battery pack may include multiple battery devices. Each battery device may include multiple battery cells and a processor to monitor the activity and status of the battery cells. Such complex battery structures have multiple potential fault points. For example, a battery cell positioned under the driver's seat of the EV may become faulty. Similarly, a battery cell positioned under the rear passenger side seat of the EV may develop a fault. Locating faulty battery pack components (e.g., battery cells) can be challenging. This is particularly true in complex battery structures having many components distributed over a relatively large area, such as in an EV. Locating a faulty battery pack component in an EV entails disassembling one or more parts of the EV, sometimes using trial-and-error. Such techniques for locating faulty battery pack components are tedious and expensive.

This disclosure describes various examples of electronic devices, such as EV battery pack controllers, that mitigate the challenges described above. An example battery pack controller is configured to determine the specific locations of battery pack components using wireless signals. For example, an EV battery pack may contain eight battery devices, with each battery device containing multiple battery cells and a battery device processor. After the EV battery pack has been installed in an EV, the battery pack controller may assign identifiers (IDs) to each of the eight battery devices. The battery pack controller may receive a wireless signal from each of the eight battery devices. For each battery device wireless signal, the battery pack controller may determine the angle of arrival and signal strength. The battery pack controller may use the angles of arrival and signal strengths to determine the location of each battery device relative to the remaining seven battery devices. The battery pack controller stores the determined locations of the eight battery devices. For example, a data structure may cross-reference the determined locations with respective battery device IDs.

Later, a battery device may send a wireless signal to the battery pack controller indicating a fault in that battery device (e.g., a battery cell has failed). The wireless signal may include a respective battery device ID. The battery pack controller uses the battery device ID to fetch the stored location of the respective battery device. The battery pack controller indicates this location to a user, such as a mechanic. For example, the battery pack controller provides a location map of the battery devices relative to the EV to the user and identifies the specific location of the faulty battery device. The user may then quickly access and repair the faulty battery device without the use of tedious and expensive trial-and-error techniques. The techniques described herein may be applied to electronic devices other than EVs, such as complex electrical systems in buildings, aircraft, spacecraft, consumer electronics, etc.

FIG. 1 is a top view of an example EV 100. FIG. 1 depicts the EV 100 as a car. However, the scope of this disclosure includes any battery-powered electronic device that may benefit from the elimination of trial-and-error techniques for locating component faults. For example, the EV 100 may be a car, truck, boat, aircraft (e.g., plane, helicopter, drone), spacecraft, consumer electronics, etc. Further, although this disclosure describes examples in the context of electronic devices, other structures and systems may benefit from the techniques disclosed herein. For example, the techniques described herein may be implemented in buildings (e.g., office buildings or homes) with complex electrical systems. In addition, these techniques may be useful for end-of-production checks, service/repair of battery packs, replacement of specific modules, updating a central coordinator algorithm, and changing the chemistry, type, or style of the batteries.

Still referring to FIG. 1, the EV 100 includes a battery pack 102. The battery pack 102 includes multiple battery devices 104. FIG. 1 shows the battery pack 102 including eight battery devices 104, but the scope of this disclosure is not limited to any particular number of battery devices 104. The EV 100 also includes a battery pack controller 106. A user (e.g., a mechanic) may couple a mobile device 108 (e.g., a smartphone) to a receptacle in the EV 100 in the position shown. Alternatively, the user or other personnel may physically hold the mobile device 108 in position as shown.

The EV 100 includes a steering wheel 110. The steering wheel 110 position denotes the driver's side of the EV 100. Accordingly, this disclosure may refer to the top row of battery devices 104 (e.g., the row aligned with the steering wheel 110) as the driver's side row. Likewise, this disclosure may refer to the bottom row of battery devices 104 (e.g., the row below the driver's side row) as the passenger's side row. This particular configuration or number of battery devices 104 does not limit the scope of this disclosure.

Although the battery pack controller 106 and the battery devices 104 are implemented in the same EV 100, the battery pack controller 106 initially does not know the locations of battery devices 104. The battery pack controller 106 may be configured to automatically, wirelessly, and quickly determine the location of each battery device 104, for example, when the EV 100 is manufactured. More specifically, the battery pack controller 106 can use angles of arrival and signal strengths of wireless signals transmitted by the battery devices 104 to determine the battery device 104 locations. For example, referring to the specific arrangement of FIG. 1, the battery pack controller 106 may receive a wireless signal from the top-left battery device 104. Using that wireless signal's angle of arrival, the battery pack controller 106 may determine that the battery device 104 is in the top row (driver's side row) and not in the bottom row (passenger's side row). Further, by comparing the strengths of signals received from the battery devices 104 in the top row, the battery pack controller 106 may rank the battery devices 104 based on distance from the battery pack controller 106. The weakest signal corresponds to the farthest battery device 104. The strongest signal corresponds to the closest battery device 104. Thus, by combining angle of arrival and signal strength information, the battery pack controller 106 may conclude that the battery device 104 sending the wireless signal in question is located in the top row (driver's side row) and the left-most column.

Such angle of arrival and signal strength techniques rely on the battery devices 104 being located in a known set of possible positions (e.g., an array having x number of rows and y number of columns). For example, because the battery pack controller 106 is positioned approximately equidistant from two rows of battery devices 104, the battery pack controller 106 is able to use angle of arrival information to determine whether a received wireless signal was transmitted from the top row or the bottom row. If the battery devices 104 were not arranged in an array, the battery pack controller 106 may not find angle of arrival information useful in determining a battery device 104's location. Further, the battery pack controller 106 may rely on being in a known position relative to the battery devices 104. For example, because the battery pack controller 106 is located separate from the array of battery devices 104, the battery pack controller 106 is able to use signal strength information to rank the battery devices 104 by distance from the battery pack controller 106. If the battery pack controller 106 were located in the middle of an array of battery devices 104, the battery pack controller 106 may not find signal strength information useful in ranking battery devices 104 by distance.

Other arrangements are possible. For example, the battery devices 104 may be arranged in arrays having n rows. The battery pack controller 106's ability to distinguish among the n rows using angles of arrival determines the maximum possible number of rows in which the battery devices 104 may be located. If the battery pack controller 106 is located too close to the array having too many rows, it may not be able to distinguish between the battery devices 104 in the rows at the array periphery. The battery devices 104 may be arranged in arrays having any suitable number of columns, as long as the battery devices 104 have wireless signal strengths adequate to communicate with the battery pack controller 106. The above description relating to the battery pack controller 106 position also applies to the mobile device 108 position.

Figure 2:
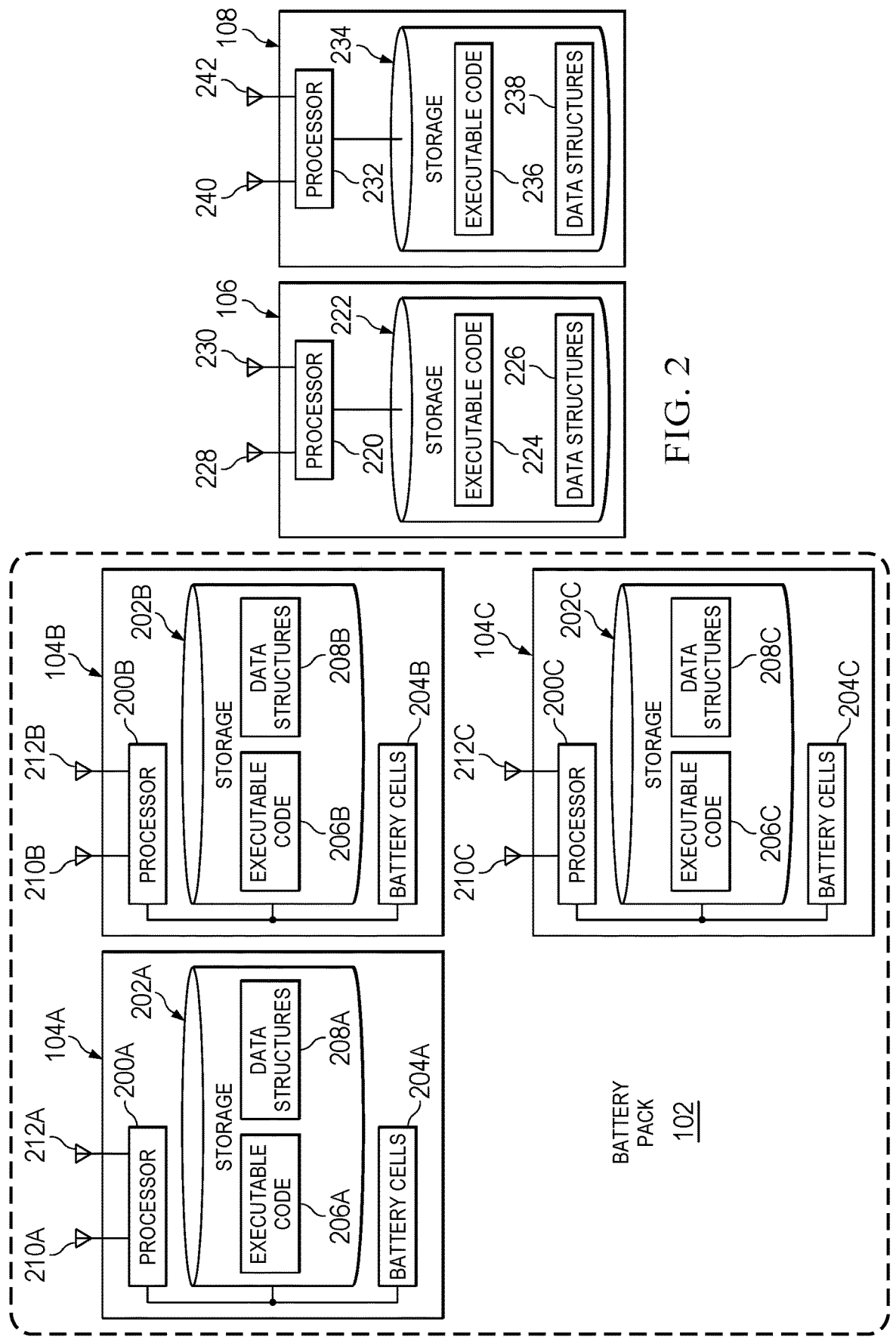
FIG. 2 is a block diagram of an example battery pack controller, example battery devices, and an example mobile device.

FIG. 2 is a block diagram of example battery devices 104A-104C in battery pack 102. FIG. 2 also shows an example battery pack controller 106 and an example mobile device 108. The battery device 104A includes a processor 200A, a storage 202A (e.g., random access memory), and battery cells 204A. The storage 202A includes executable code 206A and data structures 208A. The battery device 104A includes antennas 210A and 212A. The battery device 104A may include any suitable number of battery cells 204A and data structures 208A.

The battery device 104B includes a processor 200B, a storage 202B, and battery cells 204B. The storage 202B includes executable code 206B and data structures 208B. The battery device 104B includes antennas 210B and 212B. The battery device 104B may include any suitable number of battery cells 204B and data structures 208B.

The battery device 104C includes a processor 200C, a storage 202C, and battery cells 204C. The storage 202C includes executable code 206C and data structures 208C. The battery device 104C includes antennas 210C and 212C. The battery device 104C may include any suitable number of battery cells 204C and data structures 208C.

The battery pack controller 106 includes a processor 220 and storage 222. The storage 222 includes executable code 224 and data structures 226. The battery pack controller 106 includes antennas 228 and 230. The battery pack controller 106 may include any suitable number of data structures 226.

The mobile device 108 includes a processor 232 and storage 234. The storage 234 includes executable code 236 and data structures 238. The mobile device 108 includes antennas 240 and 242. The mobile device 108 may include any suitable number of data structures 238.

In examples, the processor 200A, the storage 202A, and the battery cells 204A are coupled to each other. The processor 200A is coupled to the antennas 210A and 212A, for example via transceiver circuitry that is not expressly shown. In examples, the processor 200B, the storage 202B, and the battery cells 204B are coupled to each other. The processor 200B is coupled to the antennas 210B and 212B, for example via transceiver circuitry that is not expressly shown. In examples, the processor 200C, the storage 202C, and the battery cells 204C are coupled to each other. The processor 200C is coupled to the antennas 210C and 212C, for example via transceiver circuitry that is not expressly shown. In examples, the processor 220 is coupled to the storage 222. The processor 220 is also coupled to the antennas 228 and 230, for example by way of transceiver circuitry that is not expressly shown. The processor 232 is coupled to the storage 234. The processor 232 is also coupled to the antennas 240 and 242, for example via transceiver circuitry that is not expressly shown.

The processor 200A is configured to execute the executable code 206A. This causes the processor 200A to perform some or all of the actions attributed herein to the processor 200A and/or to the battery device 104A. The processor 200A may store data of various types in the data structures 208A. The processor 200A may wirelessly communicate with other devices, such as those FIG. 2 shows, via one or both of the antennas 210A and 212A. The multiple antennas 210A and 212A are useful for determining a wireless signal's angle of arrival.

The processor 200B is configured to execute the executable code 206B. This causes the processor 200B to perform some or all of the actions attributed herein to the processor 200B and/or to the battery device 104B. The processor 200B may store data of various types in the data structures 208B. The processor 200B may wirelessly communicate with other devices, such as those FIG. 2 shows, via one or both of the antennas 210B and 212B. The multiple antennas 210B and 212B are useful for determining a wireless signal's angle of arrival.

The processor 200C is configured to execute the executable code 206C. This causes the processor 200C to perform some or all of the actions attributed herein to the processor 200C and/or to the battery device 104C. The processor 200C may store data of various types in the data structures 208C. The processor 200C may wirelessly communicate with other devices, such as those FIG. 2 shows, via one or both of the antennas 210C and 212C. The multiple antennas 210C and 212C are useful for determining a wireless signal's angle of arrival.

The processor 220 is configured to execute the executable code 224. This causes the processor 220 to perform some or all of the actions attributed herein to the processor 220 and/or to the battery pack controller 106. The processor 220 may store data of various types in the data structures 226. For example, the data structures 226 may cross-reference IDs for battery devices 104A-104C with identified locations for the battery devices 104A-104C. The processor 220 may wirelessly communicate with other devices, such as those FIG. 2 shows, via one or both of the antennas 228 and 230. The multiple antennas 228 and 230 are useful for determining a wireless signal's angle of arrival.

The processor 232 is configured to execute the executable code 236. This causes the processor 232 to perform some or all of the actions attributed herein to the processor 232 and/or to the mobile device 108. The processor 232 may store data of various types in the data structures 238. The processor 232 may wirelessly communicate with other devices, such as those FIG. 2 shows, via one or both of the antennas 240 and 242. The multiple antennas 240 and 242 are useful for determining a wireless signal's angle of arrival.

FIG. 3 shows an example method 300 for operating the devices of FIG. 2. In examples, the battery pack controller 106 (and, more specifically, the processor 220) performs the method 300. Referring to both FIGS. 2 and 3, the method 300 begins with the processor 220 assigning IDs to each of the battery devices 104A-104C (302). In examples, the processor 220 assigns the IDs responsive to wireless signals received from the battery devices 104A-104C. Such wireless signals may request an ID. In examples, the IDs have a digital format, although the scope of this disclosure does not require any particular type of ID. In an example, the processor 220 assigns the battery device 104A an ID of 000 and the battery device 104B an ID of 001.

The method 330 includes the processor 220 receiving a first wireless signal from a first vehicle battery device (304).

For example, the processor 220 may receive a first wireless signal from the battery device 104A. The first wireless signal may include the battery device 104A's ID (e.g., 000). The first wireless signal also may include any other suitable information, such as an instruction or request to determine a location of the battery device 104A. The method 300 includes the processor 220 receiving a second wireless signal from a second vehicle battery device (306). For example, the processor 220 may receive a second wireless signal from the battery device 104B. The second wireless signal may include the battery device 104B's ID (e.g., 001). The second wireless signal also may include any other suitable information, such as an instruction or request to determine a location of the battery device 104B.

The method 330 includes the processor 220 determining angles of arrival for the first and second wireless signals (308). The processor 220 may be able to determine the angles of arrival because the processor 220 is coupled to more than one antenna, e.g., antennas 228 and 230. Based on the angles of arrival, the processor 220 may be configured to determine that both the first and second wireless signals originated from a battery device in the top row of battery devices (e.g., from the battery devices 104A and 104B). The processor 220 may be configured to determine from the angles of arrival that the battery device 104C sent neither of the first and second wireless signals.

The method 330 includes the processor 220 determining signal strengths of the first and second wireless signals (310). Further, based on the angles of arrival and signal strengths, the processor 220 determines the location of each of the battery devices 104A and 104B relative to the other (312). For example, the processor 220 may be configured to determine the received signal strength indicator (RSSI) levels and/or high accuracy distance measurement (HADM) for the first and second wireless signals. If the first wireless signal is weaker than (e.g., has a lower RSSI level and/or HADM than) the second wireless signal, the processor 220 may be configured to determine that the first wireless signal originated in a battery device that is farther away and the second wireless signal originated in a battery device that is closer to the processor 220. Thus, the processor 220 may be configured to conclude that the battery device 104A sent the first wireless signal and the battery device 104B sent the second wireless signal. Conversely, if the first wireless signal is stronger than (e.g., has a higher RSSI level than) the second wireless signal, the processor 220 may be configured to determine that the first wireless signal originated in a battery device that is closer to the processor 220 and the second wireless signal originated in a battery device farther from the processor 220. Thus, the processor 220 may be configured to conclude that the battery device 104A sent the second wireless signal and the battery device 104B sent the first wireless signal. In this way, the processor 220 may be configured to rank the battery devices 104A and 104B by distance.

The processor 220 may store the locations of the battery devices in the data structures 226 (314). FIG. 4A shows an example data structure 226. For simplicity, the example of FIG. 4A assumes a battery pack having only two battery devices 104, both of which are in the driver's side row. Accordingly, the data structure 226 includes two columns and two rows. The first column indicates battery device ID, and the second column indicates battery device location as determined by the processor 220. The first row indicates that the battery device 104A, which has an ID of 000, is located on the driver side of the EV 100 (hence the "D") and is in the second position in the row of battery devices on the driver side of the EV 100 (hence the "2"). The second row indicates that the battery device 104B, which has an ID of 001, is located on the driver side of the EV 100 and is in the first position in the row of battery devices on the driver side of the EV 100. If the battery pack 102 included additional battery devices, the data structure 226 would also include additional rows, one for each additional battery device in the battery pack 102. The processor 220 would identify the location of each such additional battery device using angle of arrival and signal strength information, as described above. The processor 220 would store such locations in the data structures 226. For example, the example data structure 226 in FIG. 4A would show battery devices 104 located in the driver's side row and in the passenger's side row and would further indicate the order of the battery devices 104 (e.g., D1, D2, P1, P2, etc.).

Figure 4B:
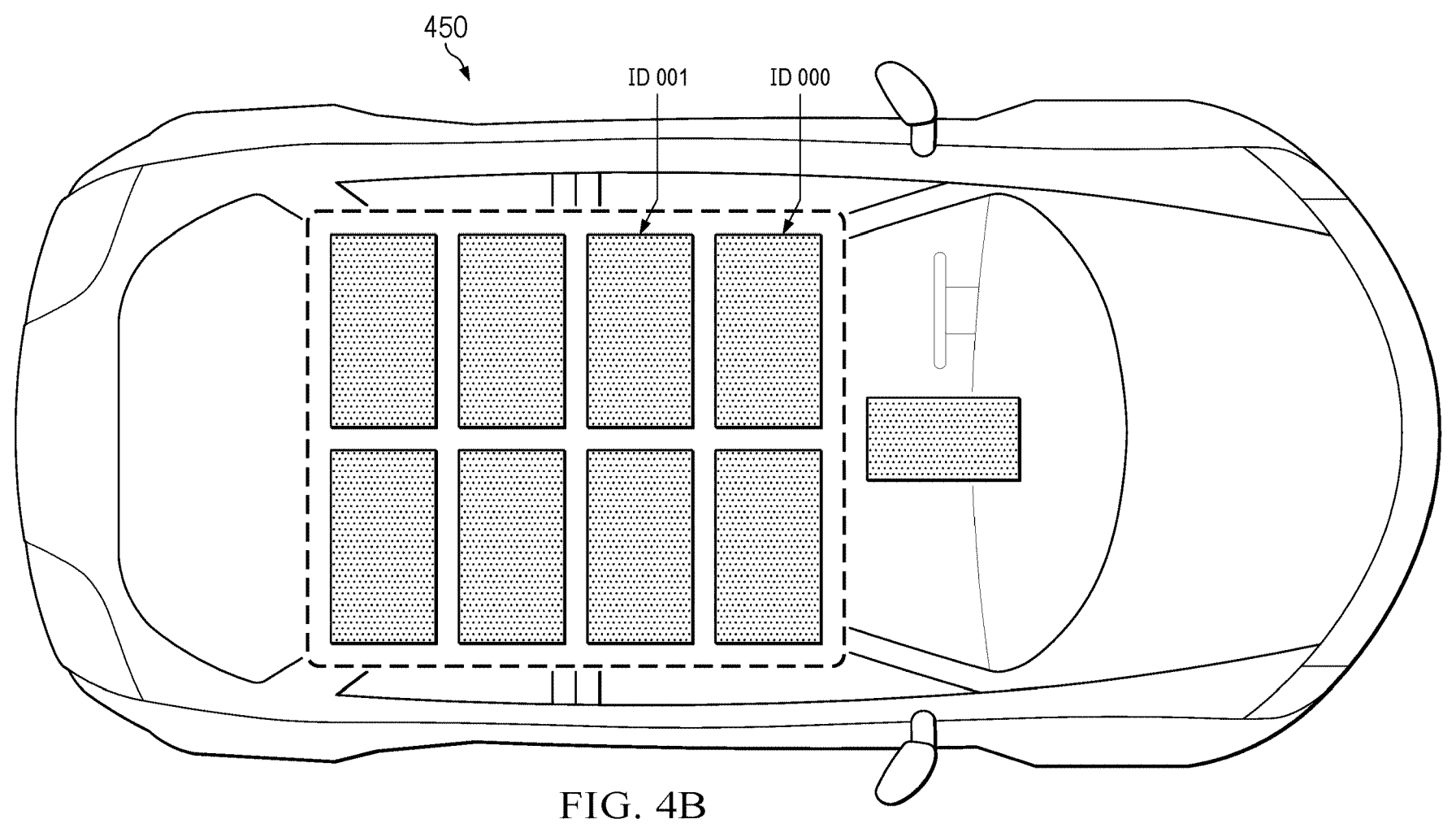

The processor 220 may generate a user-friendly location map. FIG. 4B shows an example location map 450. The location map 450 shows the battery devices 104 of FIG. 4A relative to the EV 100. As explained above, relative to FIG. 1, FIGS. 4A and 4B show a limited number of battery devices 104. The processor 220 may provide the location map to the mobile device 108 for display to a user.

Figure 4C:
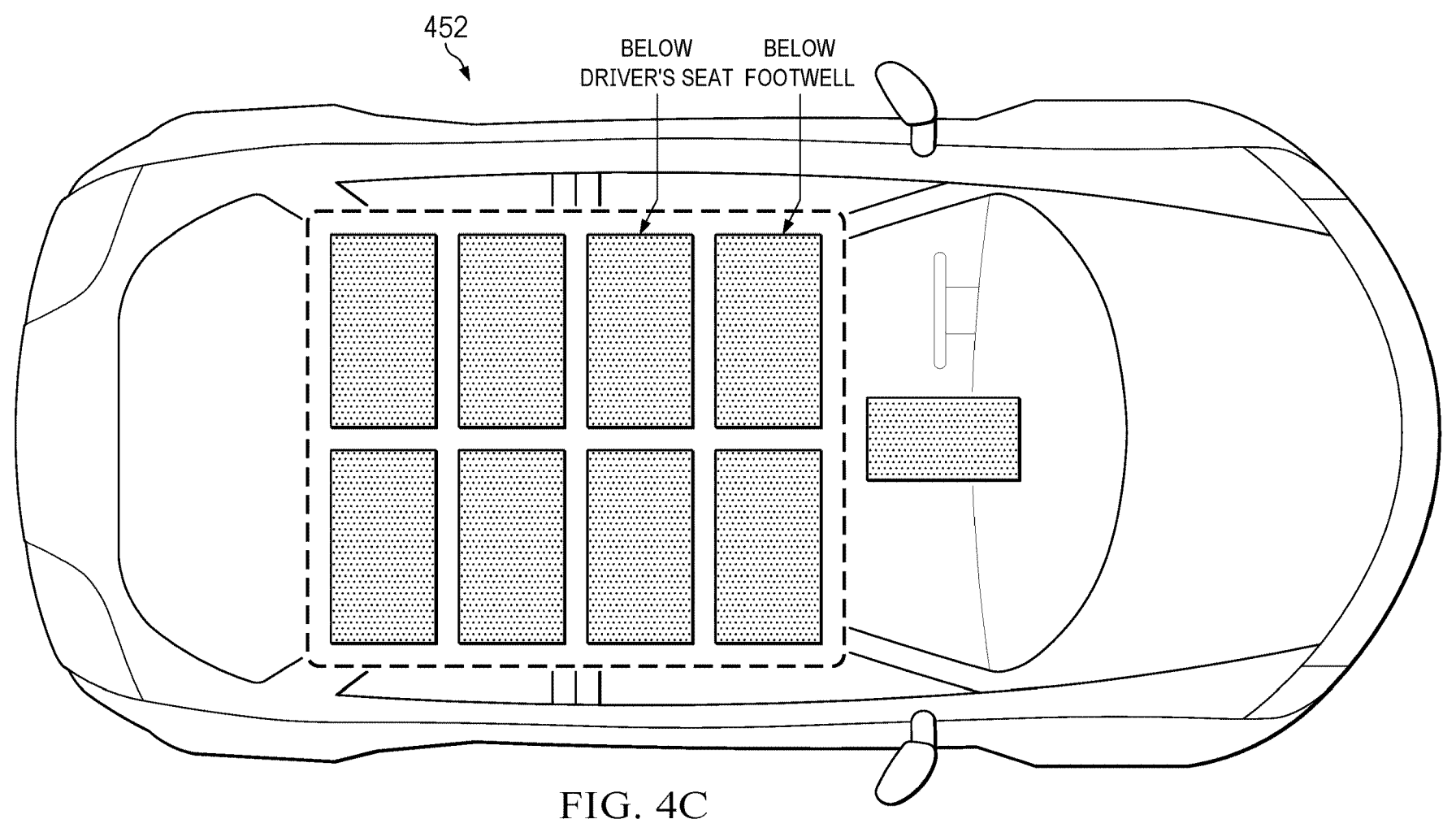

The processor 220 may receive text labels for the battery devices 104 from the mobile device 108. For example, upon viewing the location map 450 of FIG. 4B on the mobile device 108, a user may use the mobile device 108 to assign text-based location labels to the battery devices 104. The mobile device 108 may transmit the text-based location labels to the processor 220. The processor 220 may apply the text-based location labels to the location map 450 to produce a location map 452, as FIG. 4C shows. The processor 220 may transmit the location map 452 to the mobile device 108. The mobile device 108 may display the location map 452. The processor 220 may store location maps in storage 222 (FIG. 2).

FIG. 5 is a flow diagram of a method 500 for determining battery device locations using wireless signals. More specifically, the battery pack controller 106 may perform the method 500 to identify battery device locations based in part on information that other devices collect and provide to the battery pack controller 106. The method 500 begins with the battery pack controller 106 assigning IDs to the battery devices 104A and 104B, as described above (502). The method 500 includes the battery pack controller 106 receiving a wireless signal from a vehicle battery device (504) and determining a first angle of arrival for that wireless signal (506).

The method 500 further includes the battery pack controller 106 receiving, from another electronic device, an indication of a second angle of arrival for the wireless signal at the another electronic device (508). For example, the mobile device 108 may receive the wireless signal of (504) and may determine an angle of arrival for that wireless signal. Alternatively, or in addition, the battery device 104C may receive the wireless signal of (504) and may determine an angle of arrival for that wireless signal. Thus, each of the battery pack controller 106 and the mobile device 108 has determined an angle of arrival for the same wireless signal. Further, the battery pack controller 106 is programmed with the distance between the battery pack controller 106 and the mobile device 108 (e.g., the user may position the mobile device 108 in a predetermined location relative to the battery pack controller 106 during method 500). The battery pack controller 106 may perform a triangulation calculation using the two angles of arrival and the known distance between the battery pack controller 106 and the mobile device 108 (510).

Using the triangulation technique, the battery pack controller 106 determines the location of the mobile device that transmitted the wireless signal of (504). Based on this location, the battery pack controller 106 may determine, for example, that the mobile device in question is in the driver side's row, closest to the front of the car. The battery pack controller 106 may perform a similar triangulation technique with the battery device 104C. In examples, the battery pack controller 106 may perform a first triangulation technique with the mobile device 108 and a second triangulation technique with the battery device 104C. The battery pack controller 106 may combine the results of the first and second triangulation techniques to determine the location of the battery device in question with a greater degree of certainty than would be the case with a single triangulation technique. The battery pack controller 106 may store the battery device IDs and locations in the data structure 226 (512), such as FIG. 4A shows.

FIG. 6 is a flow diagram of a method 600 for determining battery device locations using wireless signals. More specifically, the battery pack controller 106 may perform the method 600 to identify battery device locations based in part on information that other devices collect and provide to the battery pack controller 106. The method 600 begins with the battery pack controller 106 assigning battery device IDs, as described above (602). The method 600 includes the battery pack controller 106 receiving a first wireless signal from a first vehicle battery device (604) and a second wireless signal from a second vehicle battery device (606). For example, the battery pack controller 106 may receive a first wireless signal from the battery device 104A and a second wireless signal from the battery device 104B. The method 600 includes the battery pack controller 106 determining first angles of arrival for the first and second wireless signals (608) and determining first signal strengths for the first and second wireless signals (610). For example, the battery pack controller 106 may determine an angle of arrival and signal strength for the first wireless signal received from the battery device 104A. Similarly, the battery pack controller 106 may determine an angle of arrival and signal strength for the second wireless signal received from the battery device 104B.

The method 600 includes the battery pack controller 106 receiving, from an electronic device, an indication of second angles of arrival and second signal strengths for the first and second wireless signals as received at the electronic device (612). For example, the mobile device 108 could receive the first and second wireless signals, determine angles of arrival and signal strengths for the first and second wireless signals, and provide the angles of arrival and signal strengths to the battery pack controller 106. Similarly, the battery device 104C could receive the first and second wireless signals, determine angles of arrival and signal strengths for the first and second wireless signals, and provide the angles of arrival and signal strengths to the battery pack controller 106.

The method 600 includes, based on the first angles of arrival, the first signal strengths, and the indication, the battery pack controller 106 determining a location of the first vehicle battery device relative to a location of the second vehicle battery device (614). For example, the battery pack controller 106 may determine that the battery devices 104A and 104B are both in the top row (e.g., driver's side). The battery pack controller 106 may further determine that the battery device 104A is farther from the battery pack controller 106 than the battery device 104B. Because the battery pack controller 106 is positioned approximately equidistant from the two rows of battery devices, the battery pack controller 106 is able to use angles of arrival to determine the row from which a particular wireless signal was transmitted. Similarly, because the mobile device 108 is approximately equidistant from the two rows of battery devices, the angles of arrival captured by the mobile device 108 are useful for determining the row from which a particular wireless signal was transmitted. Further, because the position of a battery device in a given row is determined based on signal strength of wireless signals transmitted by that battery device, the mobile device 108's signal strength information is useful in determining the relative positions of the battery devices 104A and 104B in the top row. The battery pack controller 106 may store the battery device IDs and locations in the data structure 226 (616), such as FIG. 4A shows.

The battery devices 104, the battery pack controller 106, the mobile device 108 may use any suitable wireless technology to implement the above-described techniques. In examples, these devices use radio frequency signals, such as short-range radio frequency signals. For example, the battery devices 104, the battery pack controller 106, and the mobile device 108 may include BLUETOOTH® controllers or processors configured to communicate with other devices in the EV 100 using BLUETOOTH® standards. In some examples, these devices use BLUETOOTH LOW ENERGY® standards to communicate with other devices.

During wireless communications, the battery devices 104, the battery pack controller 106, and the mobile device 108 may include data in any suitable packet fields. For example, battery devices 104 may transmit requests for IDs in payload fields (e.g., within protocol data unit (PDU) fields). Battery devices 104 may transmit subsequent packets with assigned IDs, for example in a header field or in a payload field. Battery devices 104 and the mobile device 108 may transmit data such as angles of arrival and signal strengths in payload fields. These examples do not restrict the scope of this disclosure. The wireless devices described herein may use any suitable wireless communication protocol in any suitable manner to implement one or more of the techniques described herein.

This disclosure has attributed functionality to battery pack controller 106, mobile device 108 and processors 220 and 232. Battery pack controller 106, mobile device 108 and processors 220 and 232 may include one or more processors. Battery pack controller 106, mobile device 108 and processors 220 and 232 may include any combination of integrated circuitry, discrete logic circuitry, analog circuitry, such as one or more microprocessors, microcontrollers, digital signal processors, application specific integrated circuits, central processing units, graphics processing units, field-programmable gate arrays, and/or any other processing resources. In some examples, battery pack controller 106, mobile device 108 and processors 220 and 232 may include multiple components, such as any combination of the processing resources listed above, as well as other discrete or integrated logic circuitry, and/or analog circuitry.

The techniques described in this disclosure may also be embodied or encoded in an article of manufacture including a non-transitory computer-readable storage medium, such as storages 222 and 234. Example non-transitory computer-readable storage media may include random access memory (RAM), read-only memory (ROM), programmable ROM, erasable programmable ROM, electronically erasable programmable ROM, flash memory, a solid-state drive, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. An electronic device, comprising:
   a processor; and
   storage coupled to the processor and including executable code, which, when executed by the processor, causes the processor to:
      receive a first wireless signal;
      receive a second wireless signal;
      determine a first angle of arrival for the first wireless signal and a second angle of arrival for the second wireless signal;
      determine a first signal strength of the first wireless signal and a second signal strength of the second wireless signal;
      receive angle of arrival and signal strength information for the first and second wireless signals from a second electronic device, wherein the second electronic device is a mobile device and the electronic device is positioned between the mobile device and a battery pack; and
      based on the first and second angles of arrival, the first and second signal strengths, and the angle of arrival and signal strength information from the second electronic device, determine a location within the battery pack of a first battery device of the battery pack relative to a location of a second battery device of the battery pack.

2. The electronic device of claim 1, wherein execution of the executable code causes the processor to:
   populate a data structure cross-referencing the locations of the first and second battery devices with identifiers of the first and second battery devices.

3. The electronic device of claim 1, wherein execution of the executable code causes the processor to:

generate a location map of the first and second battery devices relative to a system that includes the battery pack.

4. The electronic device of claim 3, wherein the system is an electric vehicle (EV), and wherein the location map includes the first and second battery devices arranged in an array.

5. The electronic device of claim 3, wherein execution of the executable code causes the processor to:

assign each of the first and second battery devices to a predetermined position in the location map based on the location of the first battery device relative to the location of the second battery device.

6. The electronic device of claim 1, wherein execution of the executable code causes the processor to:

perform a triangulation technique in tandem with the second battery device to determine the location of the first battery device.

7. An electronic device, comprising:

a processor; and storage coupled to the processor and including executable code, which, when executed by the processor, causes the processor to:

receive a wireless signal;

determine a first angle of arrival for the wireless signal;

receive an indication of a second angle of arrival for the wireless signal relative to another electronic device; and determine a location of a battery device within a battery pack based on the first and second angles of arrival and further based on a location of the other electronic device relative to the battery device, wherein the other electronic device comprises a mobile device and the electronic device is positioned between the mobile device and the battery pack.

8. The electronic device of claim 7, wherein execution of the executable code causes the processor to:

perform a triangulation technique to determine the location of the battery device within the battery pack based on the first and second angles of arrival and further based on the location of the other electronic device relative to the battery device.

9. The electronic device of claim 7, wherein execution of the executable code causes the processor to:

generate a location map of the battery device relative to a system including the battery device.

10. The electronic device of claim 9, wherein the system is an electric vehicle (EV), and wherein the location map includes an array of battery devices.

11. The electronic device of claim 9, wherein execution of the executable code causes the processor to:

assign the battery device to a predetermined position in the location map based on the location of the battery device within the battery pack.

12. The electronic device of claim 7, wherein the wireless signal is a BLUETOOTH® wireless signal.

13. The electronic device of claim 7, wherein execution of the executable code causes the processor to:

populate a data structure cross-referencing the location of the battery device with an identifier of the battery device.

14. A method, comprising:

receiving a first wireless signal;

receiving a second wireless signal;

determining first angles of arrival for the first and second wireless signals;

determining first signal strengths of the first and second wireless signals;

receiving an indication of second angles of arrival and second signal strengths for the first and second wireless signals relative to an electronic device; and based on the first angles of arrival, the first signal strengths, and the indication, determining a location of a first battery device within a battery pack relative to a location of a second battery device within the battery pack, wherein the electronic device comprises a mobile device that is positioned relative to the first battery device such that the electronic device is able to use an angle of arrival technique to determine which of multiple rows in an array of battery devices contains the first battery device.

15. The method of claim 14, further comprising generating a location map of a system containing the battery pack, the location map indicating a position of the first battery device relative to the system.

16. The method of claim 14, further comprising performing a triangulation technique to identify the location of the first battery device using the first and second angles of arrival and a distance between the electronic device and a second electronic device.

17. The method of claim 14, further comprising the mobile device assigning a text-based location label to the first battery device based on user input.

* * * * *